United States Patent Office 2,983,578
Patented May 9, 1961

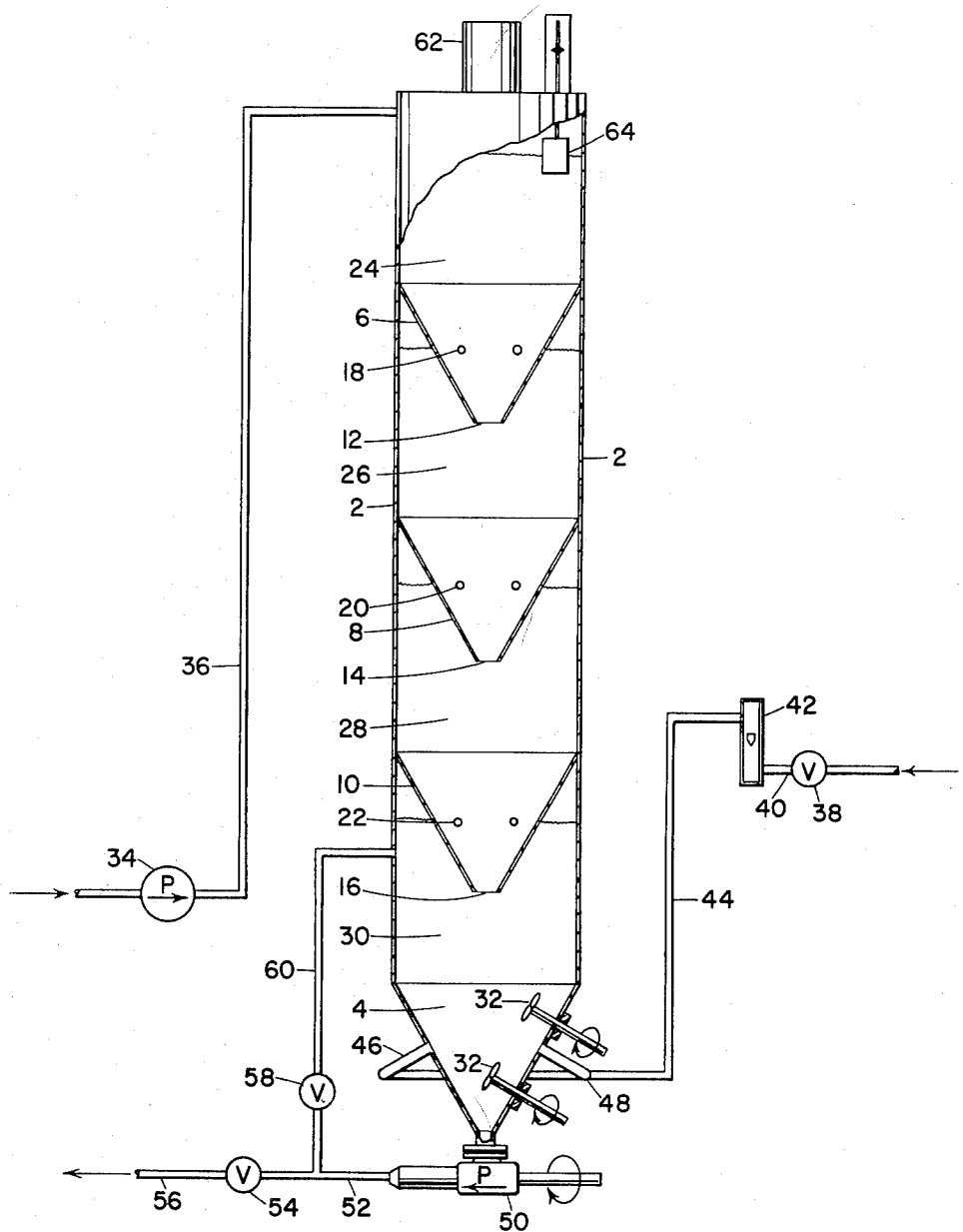

2,983,578
CONTINUOUS SOLIDS PRECIPITATOR

Leland B. Gunderson, Carl W. Carlson, and Hirsch Loevenstein, Salem, Oreg., assignors to Harvey Aluminum (Incorporated), a corporation of California Filed Sept. 11, 1956, Ser. No. 609,195
2 Claims. (Cl. 23—143)

This invention relates to apparatus for use in contacting a liquid with a gas. It pertains particularly to a continuous precipitator used for reacting a liquid with a gas to produce a solid reaction product. Such a reaction is illustrated, for example, by the reaction of a sodium aluminate solution with gaseous carbon dioxide to precipitate solid aluminum trihydrate.

Heretofore, batch precipitators conventionally have been employed in effectuating this type of reaction. Each precipitator consists of a tank into which the solution is introduced and in which it is agitated slowly while the precipitating gas is passed through it. After the reaction is complete, the resulting slurry is removed from the tank and processed for separation of the solid precipitate. The use of batch precipitators obviously is subject to the numerous disadvantages which are inherent in the use of apparatus of this class, particularly the necessity of using a large number of production units, and high operating costs.

The precipitation of a solid product from a liquid medium may be carried out continuously even when using batch precipitators of the type described above if a number of the precipitators are connected together in series, and continuous streams of the medium and a precipitating gas are passed through them consecutively in countercurrent flow. However, such an arrangement requires a massive installation with a substantial investment in tanks, pumps and connecting conduits. It also has the disadvantage that if the medium from which the solid is to be precipitated must be maintained at a temperature which is higher than room temperature, costly provision must be made for heating both the precipitators and the connecting conduits.

Accordingly, it is the general object of the present invention to provide simple, inexpensive apparatus for continuously precipitating solids such as aluminum trihydrate from a hot or cold liquid medium at a high production rate, with a high degree of efficiency, at low operating cost.

The manner in which the foregoing and other objects of this invention are accomplished will be apparent from the accompanying specification and claims considered together with the single figure of the drawing comprising a sectional view in vertical elevation of the herein described precipitator.

Generally stated, the continuous solids precipitator of our invention comprises a tower having at least one conical, perforated partition extending transversely across its interior. The base of the partition is in fixed continuous contact with the inside of the tower wall. Its apex is pointed downwardly and truncated to provide a central opening.

Means are provided for introducing liquid into the tower near its top and for introducing gas into the tower near its bottom. As the gas bubbles upwardly through the tower it is trapped progressively in the spaces between the side walls of the partitions and the tower wall until it builds up a sufficient layer to reach the perforations in the partitions. Thereupon it passes through the perforations and bubbles upwardly to the top of the tower where it is exhausted.

As the gas thus traverses the tower, it reacts with the liquid and precipitates the solid product. This gravitates downwardly, directed by the sloping side walls of the partitions, so that it passes through the central openings thereof and thence to the bottom of the tower. There it is withdrawn through means provided for that purpose.

Considering the foregoing in greater detail and with particular reference to the drawing:

The continuous solids precipitator of our invention comprises a tower indicated generally at 2 in the drawing. Although the tower may be of any desired dimensions and shape, it preferably is vertically elongated and is advantageously cylindrical in transverse section. It has a conical bottom 4.

Tower 2 is provided with a plurality of conical, perforated partitions 6, 8, 10 which extend transversely across its width. The bases of the partitions are in fixed, continuous contact with the inside wall of the tower. Their apices are pointed downwardly and cut off to provide central openings 12, 14, 16 respectively.

The dimensions of these openings are variable. However, it is preferred for most applications that the area of each such opening be equal to not less than 5% nor more than 50% of the cross sectional area of the tower.

Each partition is also formed with a plurality of perforations 18, 20, 22 respectively. These can be variable in size and position. In general, however, it is preferred to locate them substantially between the vertical midpoint of the partition and the base thereof, i.e. its point of attachment to the side walls of the tower.

The number of partitions provided can be variable depending upon the use to which the precipitator is to be put. In some instances, one or two partitions will be sufficient, although in the precipitation of aluminum trihydrate from sodium aluminate solutions a precipitator such as is illustrated in the drawing and having three partitions has given excellent results.

Further, the spacing of the partitions from each other can be variable to suit the contemplated applications. Thus they may be spaced uniformly or irregularly at the choice of the operator.

In the illustrated form of the invention, the partitions thus divide the tower into four compartments 24, 26, 28, 30, one above the other. These have substantially the same capacity, and behave as individual precipitation chambers connected in series.

Means also may be provided for agitating the slurry accumulating at the bottom of the lower compartment. Such means may comprise, for example, a motor driven agitator indicated schematically at 32.

Suitable means are present for introducing the liquid to be treated into the top of the precipitator. Accordingly the liquid may be forced by pump 34 into conduit 36 and thence into the precipitator.

Also, means are present for introducing the precipitating gas into the tower. Thus the gas may pass through a valve 38, through a conduit 40, through a flow meter 42, and through a conduit 44 which divides into branch conduits 46, 48, communicating with the bottom compartment 30 of the precipitator.

Still further, means are present for withdrawing from the bottom of the precipitator a slurry containing the precipitated solids. Such means may comprise a pump 50 which is connected to the conical bottom of the tower and which pumps the slurry therefrom into a conduit 52. From this conduit the slurry may be forced through valve 54 and conduit 56 to further processing. In the alternative, it may be cycled through valve 58 and line 60 back to any selected compartment of the precipitator, for example to the lowermost of such compartments.

Further to assist in the operation of the apparatus, there are provided an exhaust vent 62 through which the spent gas is exhausted and a level gauge 64 for controlling the level of the liquid in the tower. If desired, however, the level gauge may be replaced with other suitable measuring means such as a manometer which measures the pressure of the liquid, thus indicating its level in the tower.

If the precipitation is to be conducted at a temperature which is higher than room temperature, heating elements of appropriate design may be stationed at selected locations outside or inside the precipitator and operated to maintain the solution in the precipitator at the desired temperature level. In this connection it is noteworthy that the heat requirements of the herein described continuous precipitator are substantially lower than are those of the batch precipitators of the prior art because of the fact that its radiation surface is considerably smaller.

The operation of the herein described solids precipitator is as follows:

The liquid solution is pumped by pump 34 through line 36 into the top of the tower. The precipitating gas is introduced into the bottom of the tower through valve 38, line 40, flow meter 42, line 44 and branch lines 46, 48.

As the gas ascends in the tower it reacts with the constituents of the liquor therein. When the liquor is sodium aluminate and the gas is a carbon dioxide mixture, aluminum trihydrate is formed.

In such a case, the reactions taking place within the reactor occur in stages. The primary reaction occurring in the upper compartments of the precipitator comprises the conversion of the sodium oxide content of the liquor to sodium carbonate. Then when all of the sodium oxide has been converted to sodium carbonate, solid aluminum trihydrate precipitates predominantly in the lowest, or the two lowest, compartments.

In its upward travel, the gas impinges upon the sloping side walls of the conical partitions above the compartments which direct it upwardly into the space formed between the base of the partitions and the perforations therethrough. Here it is held under pressure until it reaches a level at which is escapes through perforations 18, 20, 22. In this manner it travels upwardly through the tower, the spent gas being exhausted through vent 62.

The liquor, on the other hand, travels in a substantially straight path downwardly through the tower, passing successively through central openings 12, 14 and 16 in the partitions. As the solid particles are formed, they gravitate downwardly along the sloping side walls of the conical partitions. Thus they are directed toward the center of the precipitator where thye flow downwardly through openings 12, 14, 16 in a stream which is substantially undisturbed by the ascending gas stream. Accordingly, there is sufficient contact between the two streams to insure thorough percipitation of the solids. However, the commingling of solutions having different degrees of precipitation, and the mixing of fresh gas newly admitted to the precipitator with that gas which has been nearly exhausted, are prevented.

When the solids reach the bottom of the precipitator they may be agitated by means of agitator 32 to keep them in a suspension which can be pumped. This suspension then is pumped by pump 50 through line 52 either to further processing, if valve 54 is open, or back to the precipitator, if valve 58 is open. The latter would be the procedure, for example, at the beginning of the operation before the precipitation reaction had been completed in the bottom compartment.

As a consequence there is provided a precipitator which is applicable to the precipitation of solids from a wide variety of commercial solutions and which is adaptable for use with such solutions whether they are hot or cold. Furthermore, the precipitator is highly efficient in its operation, simple in construction, and low in cost.

It is to be understood that the form of our invention herewith shown and described, is to be considered as a preferred example of the same, and that various changes in the shape, size and arrangement of parts may be resorted to without departing from the spirit of our invention, or the scope of the subjoined claims.

Having thus described our invention, we claim:

1. The method of continuously precipitating aluminum trihydrate from a solution of sodium aluminate by means of gaseous carbon dioxide, comprising providing a continuous vertical column of liquid comprising said solution of sodium aluminate, continuously drawing said liquid downward through the center of said column while simultaneously adding a solution of sodium aluminate at the top of the column for maintaining the height of the column substantially constant, introducing gas comprising carbon dioxide to said liquid adjacent the lower end of said column whereby to cause said gas to travel vertically upward therethrough counter-current to said downward flow of liquid, directing at least a portion of said gas toward the periphery of said column, collecting said directed gas near the periphery of the column at a level above the point of introduction of the gas into the column, re-introducing at least a portion of said collected gas into said column in a plurality of streams directed toward the center of said column at substantially said level to react with said liquid to precipitate aluminum trihydrate, directing the resulting precipitated solids downward by gravity through the downward flowing center of said liquid column, and withdrawing the central downward liquid flow and entrained solids from the bottom end of the liquid column, and recovering aluminum trihydrate therefrom.

2. The method of continuously precipitating aluminum trihydrate from a solution of sodium aluminate by means of gaseous carbon dioxide, comprising providing a continuous vertical column of liquid comprising said solution of sodium aluminate, continuously drawing said liquid downward through the center of said column while simultaneously adding a solution of sodium aluminate at the top of the column for maintaining the height of the column substantially constant, introducing gas comprising carbon dioxide to said liquid adjacent the lower end of said column, directing said gas upwardly through the liquid column concentrically about and counter-current to said central downward flow, directing at least a portion of said gas toward the periphery of said column, collecting said directed gas near the periphery of the column at a level above the point of introduction of the gas into the column, re-introducing at least a portion of said collected gas into said column in a plurality of streams directed toward the center of said column at substantially said level to react with said liquid to precipitate aluminum trihydrate, directing the resulting precipitated solids downward by gravity through the downward flowing center of said liquid column, and withdrawing the central downward liquid flow and entrained solids from the bottom end of the liquid column and recovering aluminum trihydrate therefrom.

References Cited in the file of this patent

UNITED STATES PATENTS

| | | |
|---|---|---|
| 871,300 | Schwarz | Nov. 19, 1907 |
| 1,070,438 | Fickes | Aug. 19, 1913 |
| 1,793,465 | Coahran | Feb. 24, 1931 |
| 2,055,836 | Cowles | Sept. 29, 1936 |
| 2,247,624 | Wall | July 1, 1941 |
| 2,340,690 | Richardson et al. | Feb. 1, 1944 |

FOREIGN PATENTS

| | | |
|---|---|---|
| 3,537 | Germany | Jan. 18, 1879 |